Patented June 7, 1927.

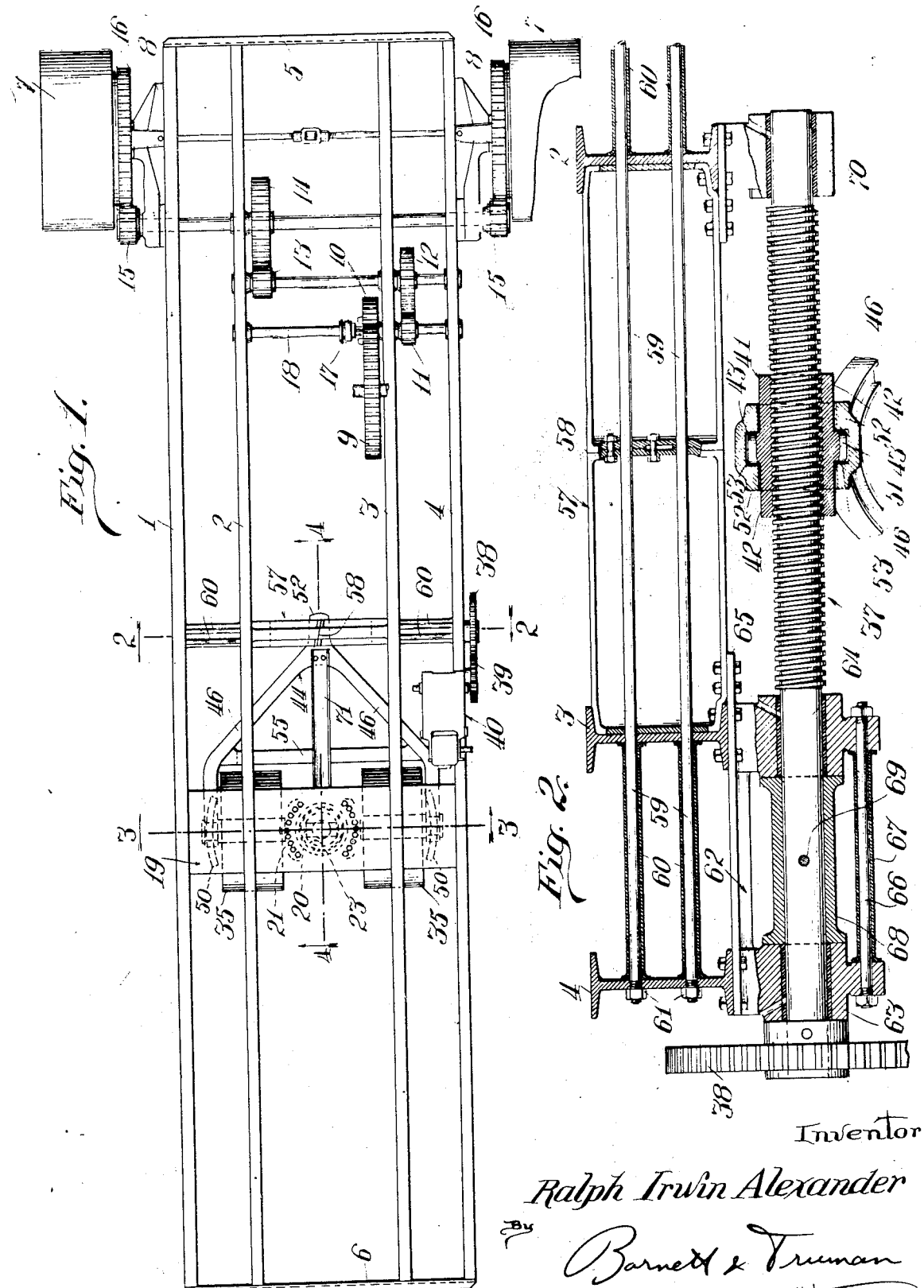

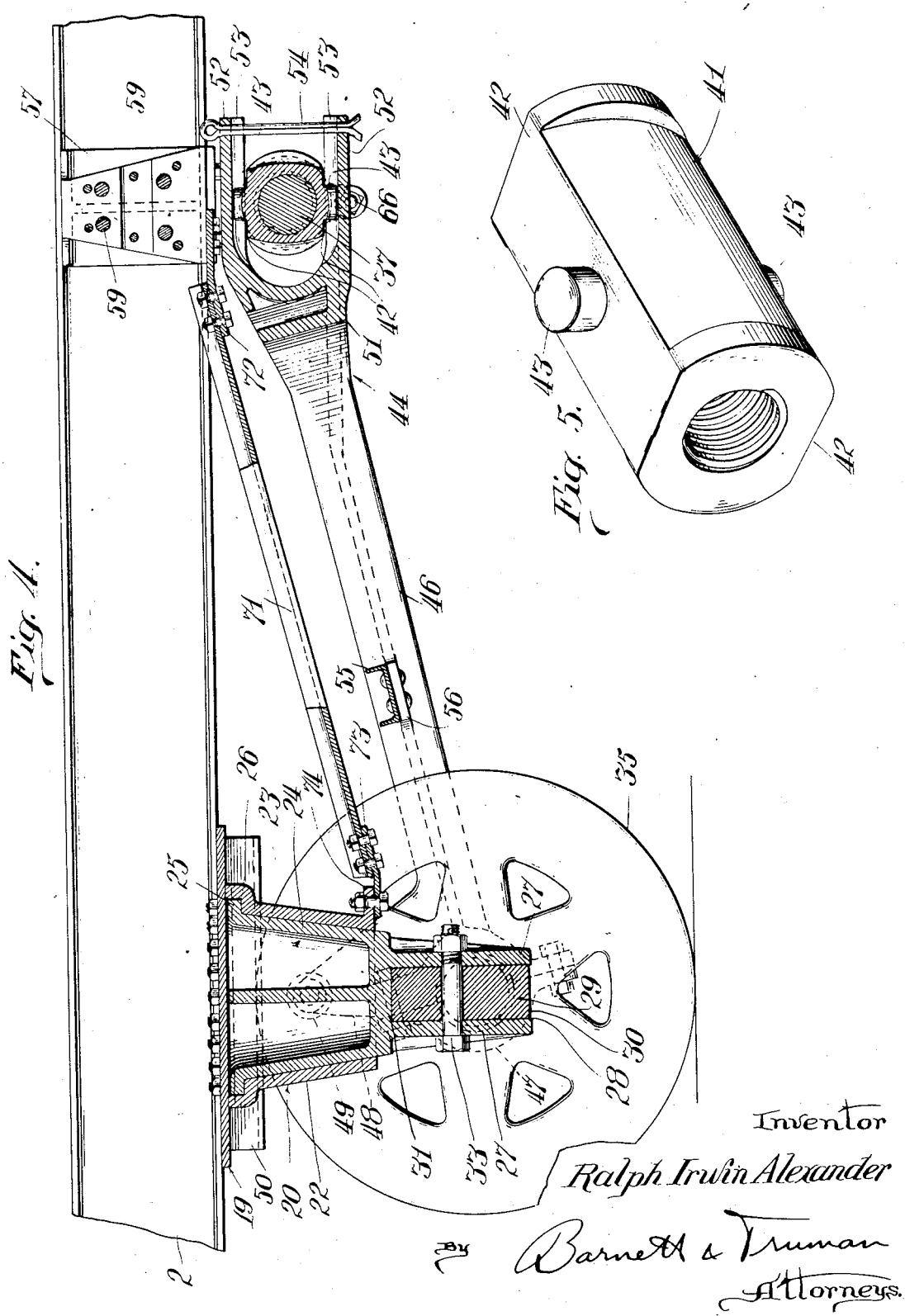

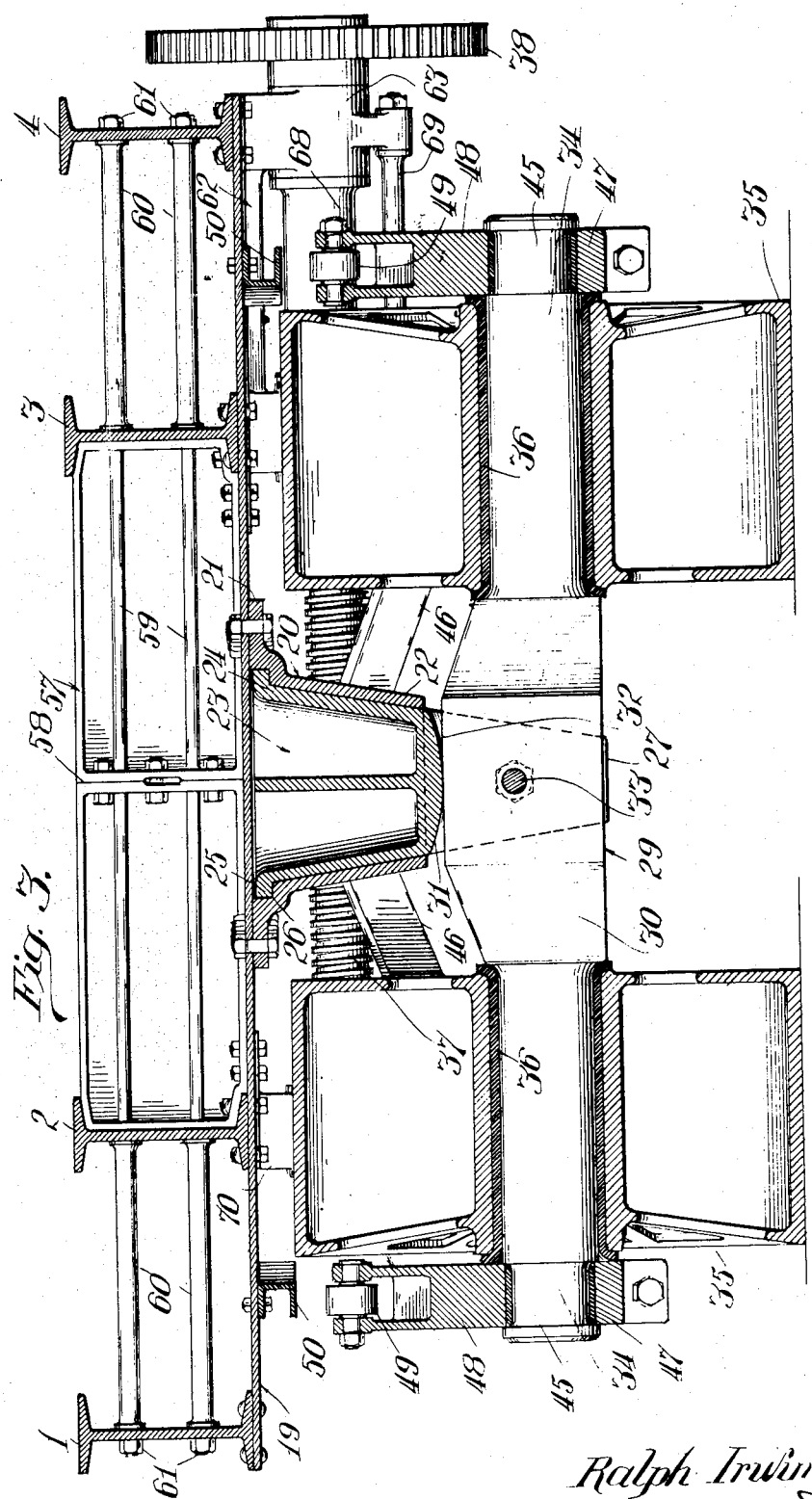

1,631,184

UNITED STATES PATENT OFFICE.

RALPH IRWIN ALEXANDER, OF KANKAKEE, ILLINOIS, ASSIGNOR TO INLAND ENGINEERING COMPANY, OF CHICAGO, ILLINOIS, A CORPORATION OF ILLINOIS.

MOBILE MACHINERY.

Application filed June 18, 1925. Serial No. 38,000.

This invention relates to traction equipment for heavy mobile machinery, and more particularly to an improved supporting and transporting carriage for massive steam shovels or excavating machinery. The present invention relates especially to that portion of the supporting mechanism for the carriage by means of which the carriage is steered.

Machines of this type usually comprise a pivoted boom, centrally mounted at the front end of the carriage for supporting and controlling the bucket or other lifting apparatus, and a lifting winch and a power plant (usually steam operated) upon the central and rear portions of the carriage. Such machines are usually mounted upon a modified railway carriage, it being necessary to lay track sections in front or behind the carriage whenever it is moved in either direction. Jack arms extend laterally outwardly and downwardly, from the front end of the carriage, and jack screws carried by these arms are screwed down into contact with the ground or other supporting surface when the machine is in operation, to steady the machine and take a part or all of the weight of this end of the apparatus from the car trucks and tracks. Such machines have also been mounted on creeping traction driving means of the endless chain type, but such apparatus is complicated and expensive and the large supporting area is unnecessary when the machines are to be operated in stone quarries, or other places where the supporting terrain is fairly firm and substantial.

In the copending application of Alexander and Exton, Serial No. 752,017, filed November 24, 1924, is disclosed a machine of this general type in which the carriage is mounted upon large, broad faced supporting wheels, which project well beyond the sides of the carriage frame, and serve not only as supporting and transporting means, but also perform the functions of the screw-jacks previously mentioned, to brace the machine at the sides, when in service.

These wheels have sufficient supporting area to carry the tremendous weight of the machine above the rocky floor of a stone quarry, and will also transport the machine easily over extremely uneven surfaces. The present invention relates to improvements on the machine disclosed in this copending application, and particularly to an improved form of steering and supporting mechanism for the rear end of the carriage.

One object of the invention is to provide a pair of steering wheels which are mounted beneath the rear end of the carriage, and which do not project beyond the sides of the carriage, so that they do not track with the front traction wheels. This arrangement tends to prevent locking of the wheels by debris which may fall behind the widespread front wheels. It also provides for easier steering and permits the use of a shorter and stronger axle construction.

Another object is to provide improved means for pivotally mounting the carriage on these steering wheels, whereby they may be swung horizontally to steer the carriage, and may also swing or rock in a vertical plane to facilitate passage over uneven ground.

Another object is to provide improved mechanism for swinging the wheels and axle laterally to steer the carriage.

Another object is to provide improved means for strengthening and bracing the carriage frame adjacent the steering mechanism to absorb and distribute the strains and side thrusts incident to the manipulation of the steering wheels.

Other objects and advantages of the invention will be apparent from the following detailed description of one approved form of the apparatus.

In the accompanying drawings:

Fig. 1 is a plan view of the carriage.

Fig. 2 is a horizontal section, on an enlarged scale, taken substantially on the line 2—2 of Fig. 1 and looking in the direction of the arrows. In this view, the spreader frame, and screw shaft, are shown in elevation.

Fig. 3 is a similar horizontal section taken substantially on the line 3—3 of Fig. 1. This view as indicated by the arrows, is taken looking in the opposite direction from Fig. 2.

Fig. 4 is a longitudinal vertical section taken substantially on the line 4—4 of Fig. 1.

Fig. 5 is a perspective view of the traveling nut forming a part of the steering mechanism.

The carriage frame comprises, preferably, a plurality of longitudinally extending I- beams 1, 2, 3 and 4, which are connected at their front ends by a cross beam 5, and at their rear ends by cross beam 6. There are other transverse bracing members between these beams, some of which will be referred to in detail hereinafter. When this carriage is used as the support for a steam shovel, the boom and other lifting mechanism will be mounted above the front end 5 of the carriage. The remainder of the carriage will carry the lifting winch, the power plant, and the fuel bins and other accessories. It should be understood at the outset that these machines are extremely massive and heavy, often weighing considerably upwards of a hundred tons, so that ordinary carriage constructions cannot be used, due to the impracticability of constructing the ordinary carriage parts of sufficient size and strength to carry the enormous load, and withstand the side thrusts and tilting strains.

The front end of the carriage, where the greater portion of the weight is concentrated, is carried upon a pair of large, broad-faced metal traction wheels 7. These wheels, which have a very wide spread or tread, not only perform the function of the jack-arms heretofore employed, but also serve as the driving traction means for moving the apparatus from place to place. These wheels 7 are mounted upon a pair of jack-arms 8, which extend outwardly and downwardly from the side carriage beams 1 and 4. Suitable means (not here shown) are used for tying together the two jack-arms 8, and distributing the load from these arms between the several beams 1, 2, 3 and 4. 9 is a large gear on the winding-drum-driving mechanism, which will be driven from the power plant on the carriage in the usual manner. The traction wheels 7 are driven from gear 9 through a train of reduction gearing 10, 11, 12, 13, 14, 15 and 16. This drive may be thrown into or out of operation by means of the clutch 17 which connects gear 10 to its shaft 18. All of the above is substantially as set forth in greater detail in the co-pending application of Alexander and Exton, Serial No. 752,017, referred to hereinabove.

The present invention relates more particularly to a new mechanism for supporting, strengthening and guiding the rear or steering end of the carriage. At the rear of the carriage, (or at an intermediate position if the load is concentrated near the forward end, as in a steam shovel), a broad flat supporting plate 19 is secured beneath the carriage beams 1, 2, 3 and 4. A swivel casting 20 is secured centrally beneath this plate 19. This casting comprises a horizontal flange 21, which is bolted to the plate 19, and a downwardly projecting hollow conical portion 22. A swivel head 23 is held within this casting 20, so that it may rotate about a central vertical axis. Head 23 comprises a main conical portion 24 fitting closely within the conical portion 22 of casting 20, and an upper outwardly flared flange 25 which fits an annular groove or recess 26 between the upper portion of casting 20 and the plate 19. The lower end of head 23 is split or forked to provide a pair of spaced downwardly projecting arms 27, between which is a recess 28 for receiving the central rectangular portion 29 of the rear axle 30. The lower surface of head 23 between the arms 27 is curved as at 31 to provide a supporting surface for the flat upper portion 32 of axle 30. A horizontal bolt or pivot pin 33 extends centrally through the arms 27 and portion 29 of axle 30, and serves to hold the axle centered against endwise movement. The greater portion of the load, however, is transmitted from the carriage to the axle 30 through the contacting surfaces 31 and 32, and is not carried by the pivot bolt 33. It will be noted that the axle and steering wheel assembly is permitted a limited rocking movement in a vertical plane about the axis of bolt 33, a certain amount of slippage taking place between the supporting surfaces 31 and 32 to permit this movement. The axle assembly pivots about the central vertical axis of castings 20 and 23 for steering the wheels as hereinafter described.

The axle 30, closely adjacent either side of the enlarged central portion 29, has a somewhat reduced cylindrical portion 34 on which is mounted one of the large broad faced metal steering wheels 35. A bearing sleeve 36, of suitable bearing metal, will be interposed between the journal 34 and wheel 35. It will be noted that the overall length of axle 30 is shorter than the width of the carriage, and that, although the wheels 35 have quite broad supporting surfaces, the axle and wheel assembly is so compact that the entire unit lies well beneath the carriage frame.

At an intermediate point below the carriage, in advance of the rear axle, a transverse screw shaft 37 is suspended in bearings hereinafter described. Mounted on one end of shaft 37 is a gear 38, which is driven through a train of gearing 39 from a reversible engine 40, whereby screw shaft 37 may be rotated in either direction as desired. A traveling nut 41, internally threaded to fit the screw shaft 37, is mounted on this shaft below and between the carriage beams 2 and 3. This nut 41 (best shown in Fig. 5) is provided with flat parallel upper and lower surfaces 42 from each of which projects a stud or pin 43.

Nut 41 is connected with the end portions 45 of axle 30, by means of a steering yoke 44. This yoke comprises a pair of side arms 46, each of which terminates in a split journal bearing 47 surrounding the adjacent cylindrical end 44 of axle 30. This connection permits a rocking movement between the axle and the yoke. Adjacent the rear end of each arm 46 is an upwardly extending projection or bracket 48, in the upper end of which is mounted a roller 49. This roller 49 is adapted to engage a track or rail 50, secured below plate 19, and limits the tilting movement of the axle assembly before the steering wheel 35 has encountered the carriage framework. The central forward portion 51 of yoke 44 is forked in a vertical plane to provide a pair of parallel arms 52 which engage therebetween the flat upper and lower surfaces 42 of nut 41, and prevent rotation of the nut. The studs 43 on nut 41 engage in grooves or slots 53 in the inner faces of arm 52. The ends of arms 52 may be connected by a pin 54. When screw shaft 37 is rotated, the nut 41, which is held from rotation by arms 52, will move longitudinally along the screw shaft. The engagement of studs 43 in the slots 53 will cause the head 51 of the yoke 44 to travel laterally with the nut. Since the head 51 must swing in an arc (about the vertical axis of casting 23), whereas the nut 41 moves in a straight line along the shaft 37, the nut 41 must move longitudinally along the arms 52, but this is provided for by the movement permitted the studs 43 in the slots 53. The arms 46 of the yoke are connected by a cross brace 55, which may be conveniently made as a separate bar bolted at its ends to the projections 56 on arms 46.

Directly above the screw shaft 37, a brace or spreader 57 is mounted between the two carriage beams 2 and 3. This spreader is in the form of a suitable angular casting, preferably of the form best shown in Figs. 2, 3 and 4, and for convenience of assembly is preferably made of two separate castings joined along a central division line 58. The spreader castings are of general I-beam form with end flanges adapted to be secured to one another and to the beams 2 and 3. Preferably the central division line 58 is on a slight angle, (see Fig. 1), and the holes for the connecting bolts are not drilled until the two halves of the spreader are assembled, so that by slightly shifting the halves horizontally with respect to one another, a certain amount of adjustment of the length of the spreader may be obtained to suit varying distances between the beams 2 and 3. Transverse tie-bolts 59 extend through the several carriage beams 1, 2, 3 and 4, passing at either side of the spreader 57, and through the end flanges thereof. Between the beams 1 and 2 and 3 and 4, these tie-bolts 59 are surrounded by tubular spools or spreaders 60, which function between these outer pairs of beams in the same manner as the spreader 57 between the inner beams 2 and 3. By means of nuts 61 on the ends of the tie-bolts 59 the beams 1, 2, 3 and 4 are held firmly together against the spreaders 57 and 60.

A casting 62, comprising a pair of bearings 63 and 64 for the screw shaft 37, is suspended from the beams 3 and 4, and also has an extension 65 bolted or riveted to the lower portion of spreader 57. The lower portions of the bearings 63 and 64 are tied together and braced by a tie-bolt 66 surrounded by a spreader spool 67. A thrust collar 68 is secured on shaft 37, as by pin 69, between the bearings 63 and 64. The other end of screw shaft 37 may be suspended from the beam 2 and the spreader 57, by means of a suitable bearing 70.

A tension rod 71 of any suitable angle material is connected at one end, by means of plate 72, with the spreader 57, and at the other end, by means of plate 73, to a bracket extension 74 at the lower end of swivel-casting 20. This tension-rod serves to brace the axle assembly against longitudinal stresses tending to move the axle out of the vertical plane of the steering axis.

In operation, when it becomes necessary to shift the steering wheels 35 about the vertical axis of head 23, in order to direct the path of travel of the carriage, the engine 40 is diven in one direction or the other to cause the nut 41 to travel in the proper direction along the screw shaft 37. This will swing the yoke 44, and the axle 30 and wheels 35 about the axis of head 23 in order to steer the carriage. Since the wheels 35 are large and broad faced, and the weight carried thereon is tremendous, there will be considerable resistance to the twisting or turning movement of the steering assembly, and this resistance will be transmitted through the yoke 44 and nut 41 and will result in an end thrust in one direction or the other along the screw shaft 37. This thrust will be transmitted through collar 68 to one or the other of the bearings 63 and 64, from which it is transmitted through casting 62 to the beams 3 and 4, and the spreader 57. The spreaders 57 and 60, and the tie-bolts 59 serve to absorb this thrust and distribute it between the several carriage beams 1, 2, 3 and 4.

Besides the more obvious advantages of compactness and strength, which are secured from the use of the relatively short axle 30 and broad faced wheels 35, and the comparatively narrow over-all width of the entire steering assembly, there are other less apparent advantages. It will be noted that the wheels 35 do not track with the front traction wheels 7, but travel well inside thereof. When a steam shovel mounted on a carriage of this type is operating in a rock quarry, or similar location, rock fragments, boulders, or other débris are very apt to fall behind the traction wheels 7 as the carriage moves forwardly into the quarry. The rear steering wheels 35 are set in so far that they will usually miss any such débris and have a clear path of travel. The limited rocking movement in a vertical plane permitted by the swiveling of the axle 30 about the pin 33 permits the wheels 35 to accommodate themselves to some extent to the unevenness of the terrain, but excessive tilting movement is limited by the engagement of the rollers 49 with the rails 50.

The simple, practically one-piece steering yoke 44, for transmitting the steering movements from nuts 41 to the steering axle 30, is very rigid and has a minimum of joints to become loose and accentuate the shocks caused by the reversal of the steering mechanism or the unevenness of the ground traveled over by the wheels 35. The inter-fitting swivel castings 20 and 23 are simple and rigid, and by means of tension rod or beam 71 are tied into the carriage framework through spreader 57, thus relieving the supporting plate 19 of a large part of the lateral twisting strains.

The short rear axle, and consequent narrow tread of the steering wheels decreases the swinging movements of the steering yoke 44, and consequently the power required for this steering operation, and at the same time permits a much shorter turning radius than is possible with the long axles heretofore in use. This provides a more easy and responsive control of the carriage, particularly when operating in a confined area.

Instead of providing an individual steering engine 40 for turning the screw shaft 37, this shaft might be driven when desired, through suitable reversing gearing from the main drive shaft at the front of the carriage. An apparatus suitable for this purpose is disclosed in connection with a different steering mechanism, in the co-pending application of Alexander and Exton, Serial No. 752,017, referred to hereinabove.

I claim:

1. In traction equipment for heavy mobile machinery, the combination with the carriage, and driving mechanism, of a non-rotary axle centrally swiveled below the carriage, a pair of steering wheels mounted on the arms at either side of the central swiveled portion, a yoke comprising a central formed portion and a pair of side arms which straddle the wheels and are connected with the ends of the axle, a horizontal screw shaft, means for rotating the shaft in either direction, and a nut on the shaft having a pair of radially extending studs, the forked portion of the yoke embracing the nut and each arm of the fork having a slot engaged by one of the studs.

2. In traction equipment for heavy mobile machinery, the combination with the carriage comprising a plurality of longitudinally extending beams, of a center casting secured beneath the carriage, a head swiveled in this casting for movement about a vertical axis, an axle connected centrally to the head, a pair of steering wheels mounted on the axle, a screw-shaft mounted beneath the carriage, a nut on the shaft, a yoke connecting the nut with the axle, a spreader frame mounted between certain of the carriage beams adjacent the screw-shaft, and a longitudinal thrust beam connecting the spreader with the center casting.

3. In traction equipment for heavy mobile machinery, the combination with the carriage comprising a plurality of longitudinally extending beams, of a center casting secured beneath the carriage, a head swiveled in this casting for movement about a vertical axis, an axle connected centrally to the head, a pair of steering wheels mounted on the axle, means for swinging the axle and wheels about the vertical axis to steer the carriage, a transverse spreader frame mounted between certain of the carriage beams, and a longitudinal thrust beam connecting the spreader with the center casting.

4. In traction equipment for heavy mobile machinery, the combination with the carriage and driving mechanism, of a non-rotary axle centrally swiveled below the carriage for both horizontal and vertical swinging movements, a pair of steering wheels mounted on the axle, a yoke straddling the wheels and having bearings at its ends pivotally engaged with the respective ends of the axle, there being upwardly projecting brackets adjacent the bearings, a roller mounted in each bracket, and trackways mounted beneath the carriage for engagement by the rollers to limit the tilting of the steering wheels.

5. In traction equipment for heavy mobile machinery, the combination with the carriage and driving mechanism, of a non-rotary axle centrally swiveled below the carriage for both horizontal and vertical swinging movements, a pair of steering wheels mounted on the axle, a yoke straddling the wheels and connected at its ends with the ends of the axle, there being upwardly projecting brackets on the yoke ends, and a roller mounted in each bracket and adapted to engage a portion of the carriage to limit the tilting of the steering wheels.

6. In combination with the carriage and the axle and steering wheels mounted under one portion thereof, means for manipulating the steering wheels comprising a transverse screw shaft, a nut mounted on the shaft, the nut having two opposite flat faces, a yoke with its outspread arms engaging the axle, the central portion of the yoke being forked in a vertical plane, the arms of the fork engaging the opposite flat faces of the nut, and pin and slot interengaging means on the fork-arms and the nut whereby the fork is caused to move laterally with the nut, but the nut is permitted to move longitudinally between the fork arms.

7. In combination with the carriage and the axle and steering wheels mounted under one portion thereof, means for manipulating the steering wheels comprising a transverse screw shaft, a nut mounted on the shaft, the nut having two opposite flat faces, a yoke with its outspread arms engaging the axle, the central portion of the yoke being forked in a vertical plane, the arms of the fork engaging the opposite flat faces of the nut, the fork-arms having longitudinal slots therein, and studs on the nut engaging in these slots.

8. In traction equipment for heavy mobile machinery, the combination with the carriage comprising a plurality of longitudinally extending beams, of an axle centrally swiveled below the carriage, a pair of steering wheels mounted on the axle, a yoke connected with the axle, a transverse screw-shaft, a nut on the shaft connected with the yoke, means for rotating the screw-shaft in either direction, and means for supporting the screw shaft beneath the carriage comprising a pair of bearings connected by a supporting base which is mounted against the bottom of a plurality of the carriage beams, and a thrust-collar secured on the shaft between the two bearings.

9. In traction equipment for heavy mobile machinery, the combination with the carriage comprising a plurality of longitudinally extending beams, of an axle centrally swiveled below the carriage, a pair of steering wheels mounted on the axle, a yoke connected with the axle, a transverse screw-shaft, a nut on the shaft connected with the yoke, means for rotating the screw shaft in either direction, a transverse spreader beam mounted between the central pair of carriage beams, and means for supporting the screw shaft beneath the carriage comprising a pair of bearings connected by a supporting base which is mounted against the bottom of a plurality of the carriage beams and a portion of the spreader, and a thrust collar secured to the shaft between the bearings.

10. In traction equipment for heavy mobile machinery, the combination with the carriage comprising a plurality of longitudinally extending beams, and driving and steering mechanisms connected with and supporting the carriage, the steering mechanism comprising a transverse screw shaft mounted beneath the carriage, of means for transmitting the lateral thrusts of this shaft to the several beams comprising a two-part spreader casting fitting transversely between the central pair of carriage beams, tie-bolts extending transversely through the several beams adjacent the spreader casting, and spreader spools on the tie-bolts between the outer pairs of beams.

11. In traction equipment for heavy mobile machinery, the combination with the carriage comprising a plurality of longitudinally extending beams and driving and steering mechanisms connected with and supporting the carriage, the steering mechanism comprising a transverse screw shaft mounted beneath the carriage, of means for transmitting the lateral thrusts of this shaft to the several beams comprising a two-part spreader casting fitting transversely between the central pair of carriage beams, the two parts connecting on a diagonal line to permit adjustment of the length of the casting.

RALPH I. ALEXANDER.